(12) United States Patent
Ruffin et al.

(10) Patent No.: US 7,300,185 B1
(45) Date of Patent: Nov. 27, 2007

(54) QUADRILATERAL SYMMETRICAL LIGHT SOURCE

(75) Inventors: Marvin Ruffin, Chicago, IL (US); Craig Fields, Chicago, IL (US)

(73) Assignee: Opto Technology, Inc., Wheeling, IL (US)

( * ) Notice: Subject to any disclaimer, the term of this patent is extended or adjusted under 35 U.S.C. 154(b) by 397 days.

(21) Appl. No.: 10/612,612

(22) Filed: Jul. 2, 2003

Related U.S. Application Data (60) Provisional application No. 60/448,090, filed on Feb. 19, 2003.

(51) Int. Cl.
   *F21V 7/04* (2006.01)
(52) U.S. Cl. .................. 362/347; 362/334; 362/335; 362/349; 362/346
(58) Field of Classification Search ............. 362/327, 362/334–335, 347, 361, 349, 300, 307, 296, 362/623–624, 514, 345, 308; 359/710, 708, 359/867; 313/512
   See application file for complete search history.

(56) References Cited

U.S. PATENT DOCUMENTS

| | | | | |
|---|---|---|---|---|
| 2,293,597 A | * | 8/1942 | Dietz ..................... | 359/710 |
| 2,390,424 A | * | 12/1945 | Colbert ................. | 359/603 |
| 3,883,731 A | * | 5/1975 | Morton et al. ......... | 362/327 |
| 4,081,667 A | * | 3/1978 | Lewin et al. .......... | 362/296 |
| 4,630,180 A | * | 12/1986 | Muraki et al. ........ | 362/223 |
| 5,594,433 A | | 1/1997 | Terlep | |
| 5,608,290 A | | 3/1997 | Hutchisson et al. | |
| 5,813,752 A | * | 9/1998 | Singer et al. .......... | 362/293 |
| 5,897,201 A | * | 4/1999 | Simon .................. | 362/268 |
| 5,929,788 A | | 7/1999 | Vukosic | |
| 6,086,220 A | | 7/2000 | Lash et al. | |
| 6,100,791 A | | 8/2000 | Bader et al. | |
| 6,183,100 B1 | | 2/2001 | Suckow et al. | |
| 6,380,865 B1 | | 4/2002 | Pederson | |
| 6,547,423 B2 | * | 4/2003 | Marshall et al. ....... | 362/333 |
| 6,560,039 B1 | * | 5/2003 | Webb et al. .......... | 359/731 |
| 6,670,763 B2 | * | 12/2003 | Golz et al. ............ | 315/56 |
| 2002/0005826 A1 | | 1/2002 | Pederson | |
| 2002/0036908 A1 | | 3/2002 | Pederson | |
| 2002/0041499 A1 | | 4/2002 | Pederson | |
| 2002/0048174 A1 | | 4/2002 | Pederson | |

* cited by examiner

*Primary Examiner*—Ali Alavi
*Assistant Examiner*—Robert May
(74) *Attorney, Agent, or Firm*—Mayer Brown LLP (57) ABSTRACT

A reflector for focusing light emitted from a light source in a generally planar direction is disclosed. The reflector is matched with the light source that is preferably a light emitting diode (LED) mounted on a substrate. The reflector is mounted over the LED on the substrate. The reflector is made of a clear material. The reflector has a semi-cylindrical front surface and a back surface with an indentation that is compatible with the light source. The reflector has a top reflecting surface divided into two quadrants and a bottom reflecting surface divided into two quadrants. The top quadrants and bottom quadrants are symmetrical in shape and reflect light emitted from the light source in a substantially horizontal plane. The reflecting surfaces may be TIR based or they may be coated with a reflective material in order to focus light from the LED.

12 Claims, 8 Drawing Sheets

QUADRILATERAL SYMMETRICAL LIGHT SOURCE

RELATED APPLICATION

This application claims priority from Provisional Application No. 60/448,090 filed on Feb. 19, 2003 which is incorporated by reference.

FIELD OF INVENTION

The present invention relates generally to the field of light sources. More specifically, the present invention is directed to a light source having a quadrilateral symmetrical reflector to allow focused light output.

BACKGROUND OF INVENTION

Light emitting diodes (LEDs) are well known solid state light sources. LEDs have many advantages over traditional sources such as incandescent bulbs as they are cheaper to produce, are more robust, and require less power. Other current alternative light sources include xenon lamps which increase light output but require a high operating voltage and has a limited life span. However, traditional light sources are used for numerous applications which take advantage of some of the characteristics of the light source but are often limited by other characteristics as well.

Traditional light sources have different thermal, optical and geometric limitations that differ greatly from light emitting diodes (LED). These differences may include maximum operating temperature for example. These differences have limited the use of LEDs in traditional lighting applications.

The use of LEDs to replace tradition light applications has been desired, but adaptation of the LEDs to a traditional lighting mounting arrangements has been difficult. In particular, a well defined beam is needed for applications such as obstruction lighting, including FAA lights L864, L810 and L865, marine navigational light and landscape lighting. The current LED light sources have reflectors designed much like reflectors for traditional lighting sources. These reflectors have rotational symmetry and thus cannot focus the light of the LED in order to satisfy the above mentioned applications.

Thus, there is a need for a lighting system which provides the means to use a LED in traditional lighting system applications. There is a further need for a lighting mount which allows an overlap in focused beams. There is yet another need for a modular lighting unit which can use less units to generate the same amount of light.

SUMMARY OF THE INVENTION

These needs and others may be met by the present invention, an example of which is a directed light source for efficient light emission. The light source has a planar substrate having a front surface and an opposite back surface. A light emitting device is located on the front surface of the planar substrate. A clear reflector has a back surface facing the front surface of the planar substrate and a semi-cylindrical front surface. The reflector includes a reflecting top surface and an opposite and quadrilaterally symmetrical reflecting bottom surface. The reflector causes light from the light emitting device to be directed out from the cylindrical front surface at a predefined angle.

Another example of the present invention is a reflector for focusing light emitted from a light source in a generally planar direction. The reflector includes a semi-cylindrical front surface and a back surface with an indentation which is shaped to cover the light source. A top reflecting surface is divided into two quadrants. A bottom reflecting surface is divided into two quadrants. The top quadrants and bottom quadrants are symmetrical in shape and reflect light emitted from the light source in a substantially horizontal plane.

Another example of the present invention is a reflector for focusing light emitted from a light source in a generally planar direction. The reflector has a curved front surface and a back surface in proximity to the light source. A top reflecting surface is divided into two quadrants and a bottom reflecting surface is divided into two quadrants. The top quadrants and bottom quadrants are symmetrical in shape and reflect light emitted from the light source in a substantially horizontal plane out of the front surface.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

These and further aspects and advantages of the invention will be discussed more in detail hereinafter with reference to the disclosure of preferred embodiments, and in particular with reference to the appended Figures wherein.

DESCRIPTION OF THE PREFERRED EMBODIMENT

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 1:
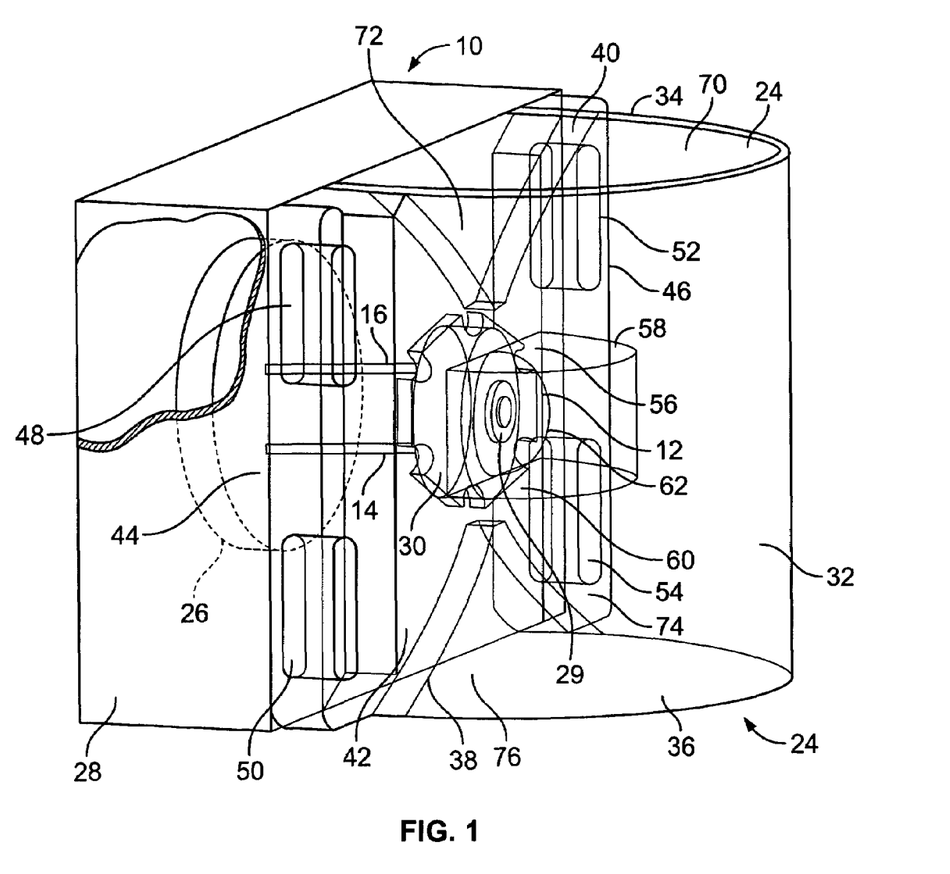
FIG. 1 is a perspective view of a lighting device using the improved reflector according to one example of the present invention.

FIG. 1 shows a lighting device 10 which is one example of the present invention. The lighting device 10 is centered around an LED 12 which is any semi-conductor, solid state light source such as a flat LED. The LED 12 will preferably have a lambertian distribution for the widest angle distribution of light. The LED 12 is coupled to a power source via two electrical leads 14 and 16. The LED 12 is affixed to a planar substrate 18. The planar substrate 18 is typically made from a highly thermally conductive material such as aluminum. The planar substrate 18 has a back surface with an opposite planar front surface. Of course other curved shapes may be used. A reflector 24 which is fabricated from a clear material such as PMMA, acrylic, glass or plastic is mounted on the front surface of the substrate.

The substrate 18 can also be mounted to a heat spreader 26 coupled to a heat sink 28 to aid in heat dissipation from the LED 12. The substrate 18 with the heat spreader 26 and the heat sink 28 is ideally exposed to the surrounding environment or incorporates some heat dissipating device or devices such as a standard heat sink or another design using extruded metal (not shown).

Of course, multiple LEDs may be affixed to the planar substrate 18 behind the reflector 24 in order to increase light output if desired. The LED 12 in this embodiment is a Luxeon LED available from Lumileds. Alternatively, the LED 12 may be a pre-packaged part such as a surface mount (SMT) or a though hole package, or an LED chip mounted directly to the substrate (chip on board, COB). The wavelength of the light is controlled by the material properties such as doping level and energy gap or by a florescing overcoat on the LED 12. Of course conventional light sources may be used such as tungsten halogen and incandescent bulbs with the appropriate modifications to the reflector 24. The LED 12 includes an LED die 29 and a body or base 30

Figure 2:
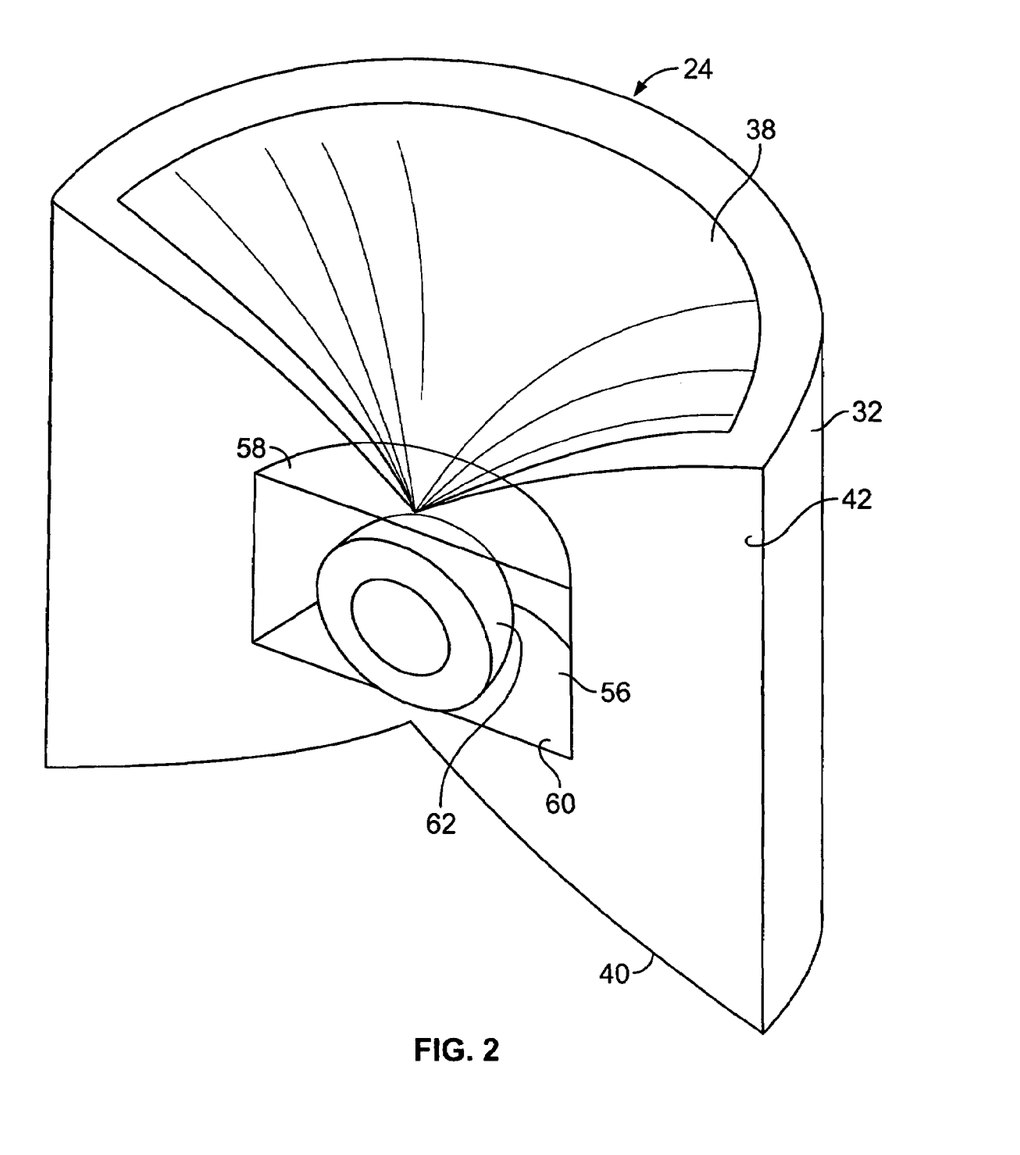
FIG. 2 is a perspective view of the improved reflector of the lighting device in FIG. 1.

The reflector 24 has a semi-cylindrical front surface 32. A symmetrical top 34 and bottom 36 have angled reflective surfaces 38 and 40 respectively. The angled surfaces 38 and 40 of the reflector 24 can either be specular or total internal reflection (TIR) based. Both of these types can have a smooth and/or faceted surface to control beam distribution and/or uniformity from the LED 12.

The smooth surfaces of the angled reflective surfaces 38 and 40 may be comprised of any one or more of the following surfaces; parabolic, elliptical, spherical or high/low order mathematical function with the LED 12 located near the apex. Both of these design types are usually optimized for a far field pattern to reduce power consumption. If the reflector 24 is TIR based then the shape of the surfaces 38 and 40 are determined by the law of total internal reflection as no other material other than the bulk material of the reflector 24 is used to reflect the light. In the case of specular based reflection, a mirror coating such as aluminum may be evaporated on the surfaces 38 and 40 or a material such as chrome may be sprayed on the surfaces 38 and 40.

In applications such as a tail light with a wide beam pattern, it is desirable to form facets on the surfaces 38 and 40. The facets are typically comprised of concentric and/or planar facets with respect to the LED 12. The facets are then formed on the surfaces 38 and 40 by breaking the surfaces 38 and 40 into planar or curved segments.

Figure 4:
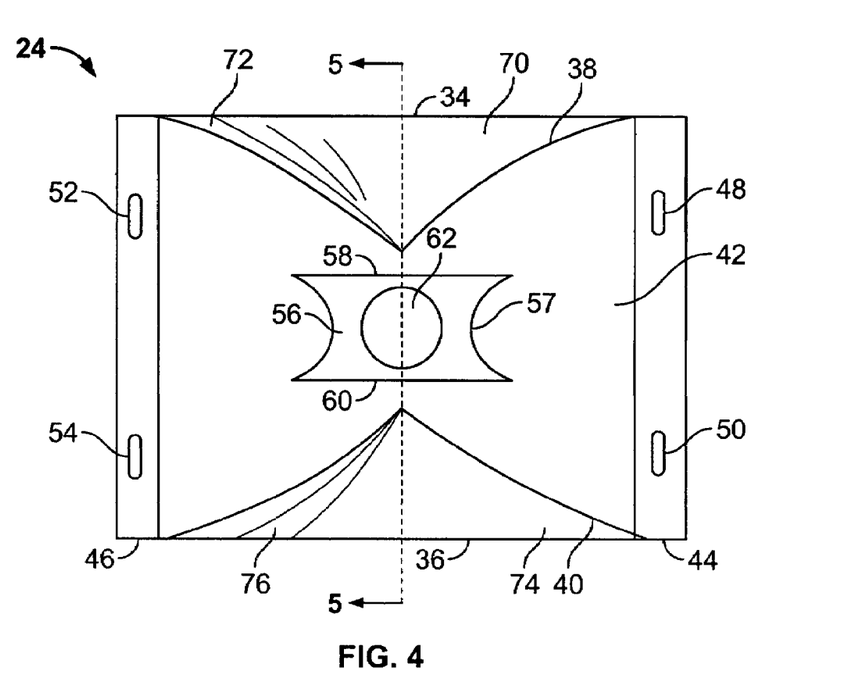
FIG. 4 is a back view of the improved reflector of the lighting device in FIG. 1.

The reflector 24 has an opposite back surface 42. The back surface 42 has a pair of tabs 44 and 46. The tabs 44 and 46 provide mounting areas to the substrate 18. The tabs 44 and 46 have mounting holes 48, 50, 52 and 54 that may be used to hold fasteners such as screws or rivets to fix the reflector 24 to the substrate 18 in proper alignment with the LED 12. Of course other means may be used to couple the reflector 24 and the substrate 18.

The reflector 24 also has an indentation 56 on the back surface 42 which is fitted to the substrate 18. The indentation 56 has a pair of opposite semi-circular top and bottom refractive surfaces 58 and 60 that are located around a lens 62 which covers the LED die 29 which further collects light from the LED die 29. The indentation 56 is of sufficient size to accommodate the LED 12 including the lens 62.

Figure 3:
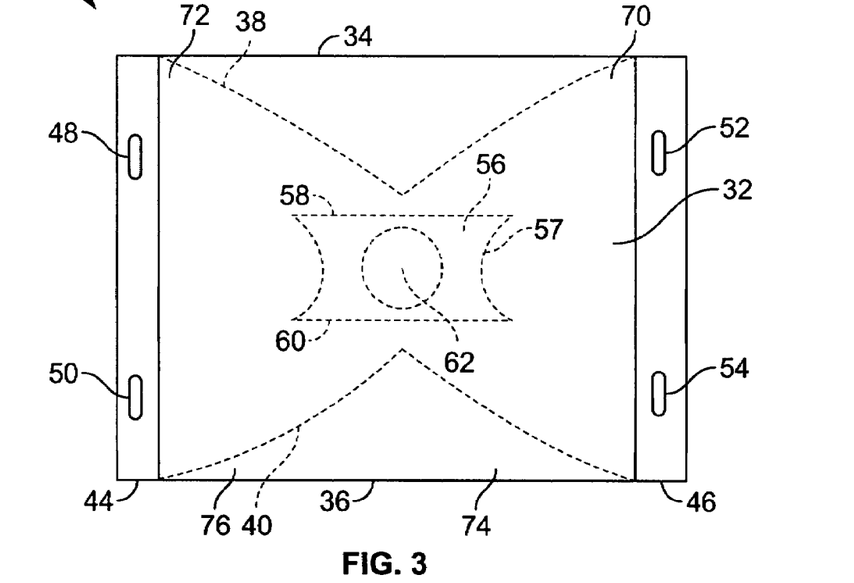
FIG. 3 is a front view of the improved reflector of the lighting device in FIG. 1.

The reflector 24 is preferably fabricated from PMMA/acrylic, but any other clear material may be used such as glass. The reflector 24 is fabricated to employ quadrilateral symmetry as opposed to rotational symmetry. Thus the top reflective surface 38 is defined by quadrants 70 and 72 while the bottom reflective surface 40 is defined by quadrants 74 and 76. The quadrilateral symmetry makes each quadrant 70, 72, 74 and 76 of the reflector 24 a mirror/rotated image of itself. Thus, quadrants 70 and 72 are mirror images, while quadrants 74 and 76 are mirror images. This is the same symmetry present in a rectangle but, unlike a rectangle which is planarly shaped, the reflector 24 has a curvature in the form of the reflective surfaces 38 and 40. The curvature is dictated by the radiation pattern of the LED 12 so optimally all the light is collected and is typically emitted in a 180 degree angle arc about the LED 12. A parabolic profile is selected for shaping the quadrants 70, 72, 74 and 76 and the outer surface 32 is semi-cylindrical. The foci of the quadrants 70, 72, 74 and 76 are preferably located at the focal smear of the LED 12. The refractive index of the material of the reflector 24 also influences the location of the focal smear of the LED 12.

The indentation 56 allows light rays from the LED 12 to be emitted through the reflector 24 at perpendicular angles to the surface 32. This allows the light rays to be refracted from the surfaces 58 and 60 with little or not change in angle. Alternatively and as shown in FIG. 2, the indentation 56 may be made with a straight wall to allow the light to refract at the media surface. The refraction is governed by Snell's law of refraction and thus the refraction at the surfaces of the indentation 56 changes the angle of the light and thus the location of the focal smear.

Figure 5:
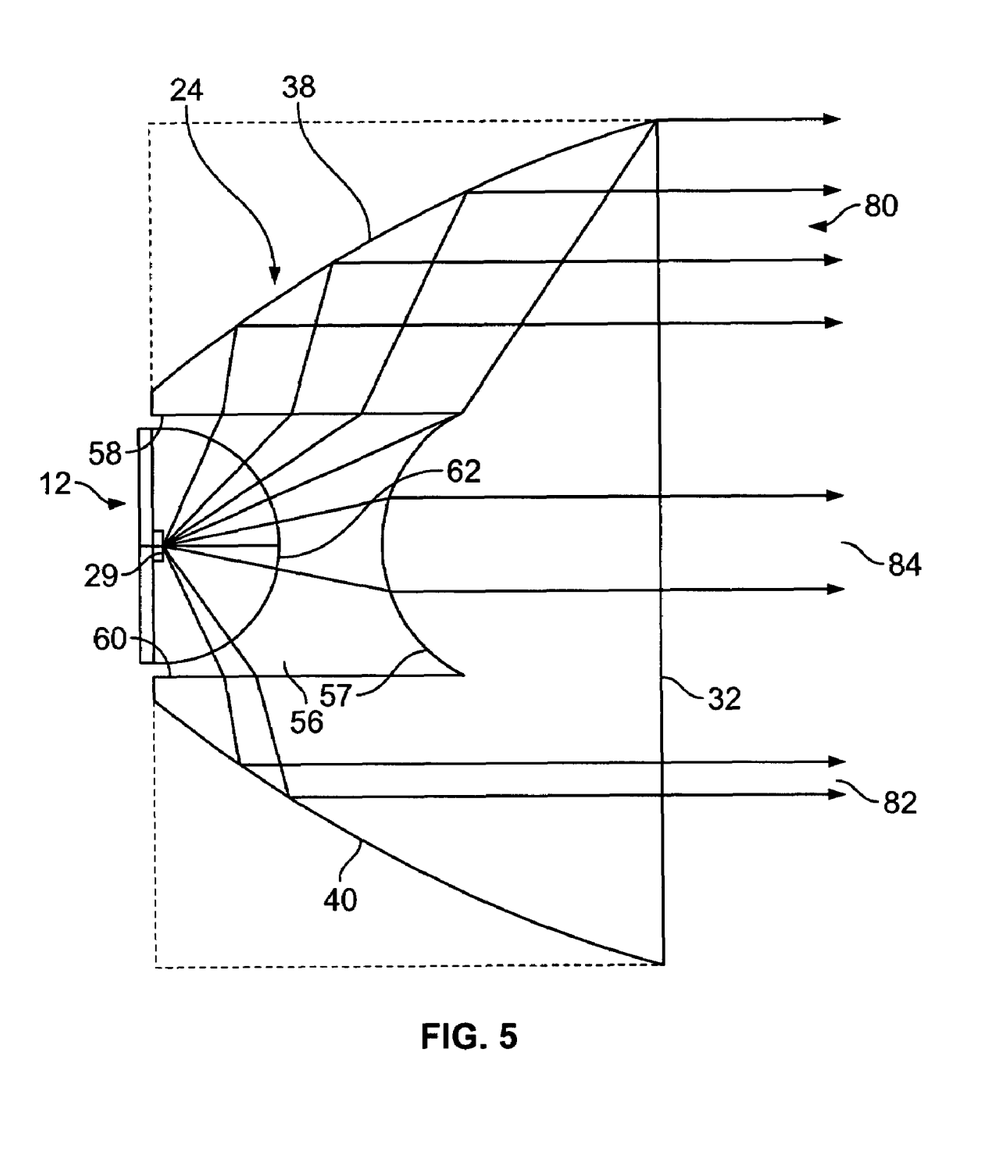
FIG. 5 is a cross section view of the reflector in FIG. 1 which shows the emission of light rays from the lighting device.

Furthermore and with reference to FIGS. 3, 4 and 5, with a TIR based reflector the lens 57 is added to indentation 56 to refract the light that is not collected by the TIR surfaces 38 and 40 of the reflector 24. The lens 57 may have either or a combination of the following surfaces: flat, convex, fresnel or concave that helps meet a beam distribution or lighting effect. In this example the lens 57 is a convex internal lens allowing for a greater collection of light.

In operation the shape of the reflector 24 allows the light from the LED 12 to be emitted in a horizontal plane from the front surface 32. Light that is emitted in the vertical plane at angles greater than the desired emission angle in the horizontal plane, is reflected outward by the reflective surfaces 38 and 40. FIG. 5 is a cross section of the reflector 24 which shows light rays emitting from the LED 12. A series of light rays 80 are refracted by the upper refractive surface 58 and reflected by the top surface 38 to be emitted in a focused plane. A series of light rays 82 are refracted by the lower refractive surface 60 and reflected by the bottom surface 40 to be emitted in a focused plane. A series of light rays 84 which miss the reflective surfaces 38 and 40 are focused by the lens 62.

Figure 6:
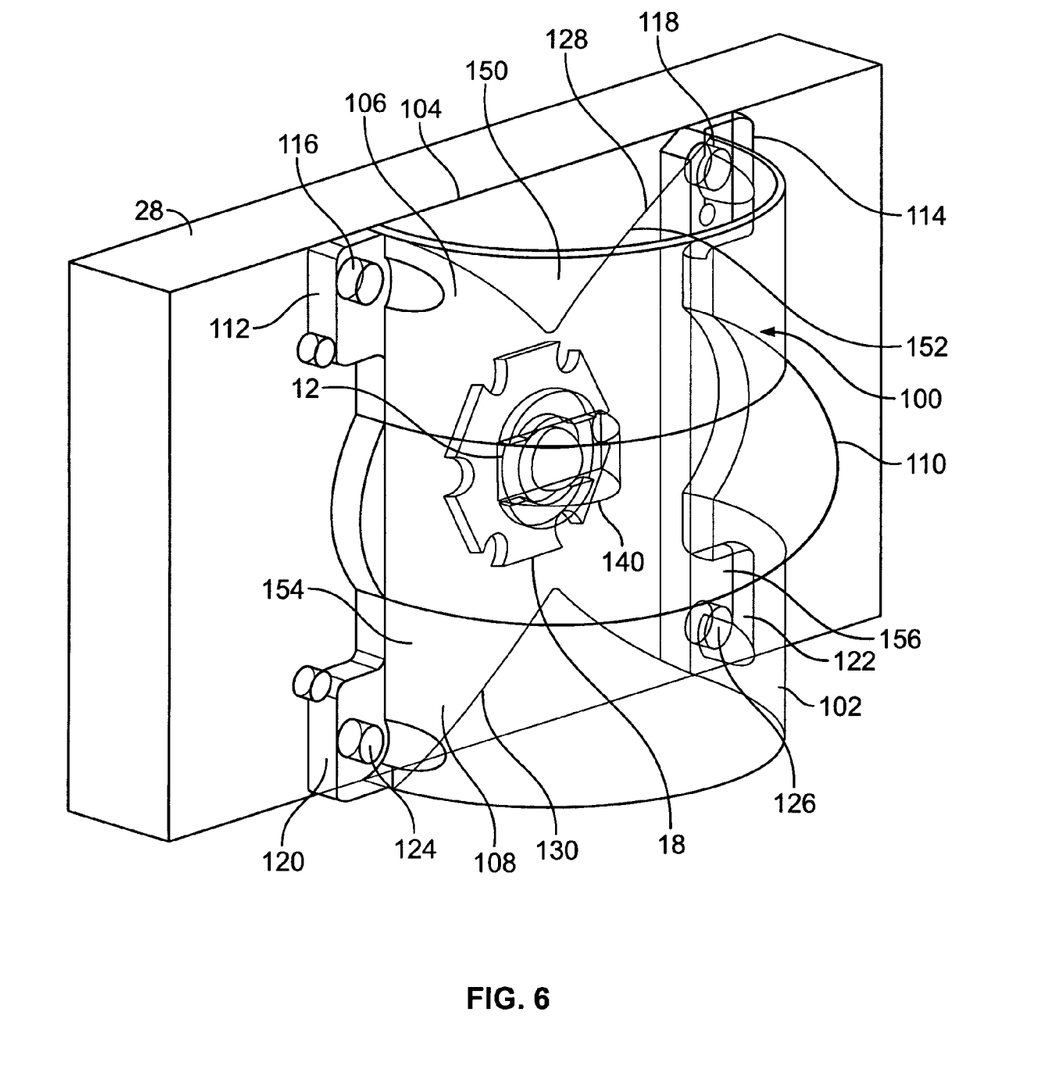
FIG. 6 is a perspective view of an alternate reflector which is another example of the present invention.
Figure 7:
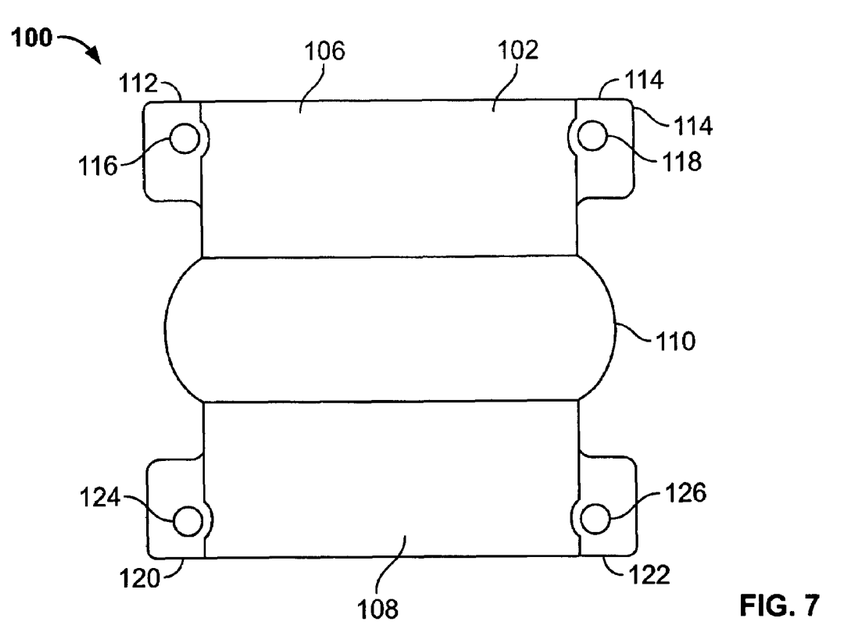
FIG. 7 is a front view of the reflector shown in FIG. 6.
Figure 8:
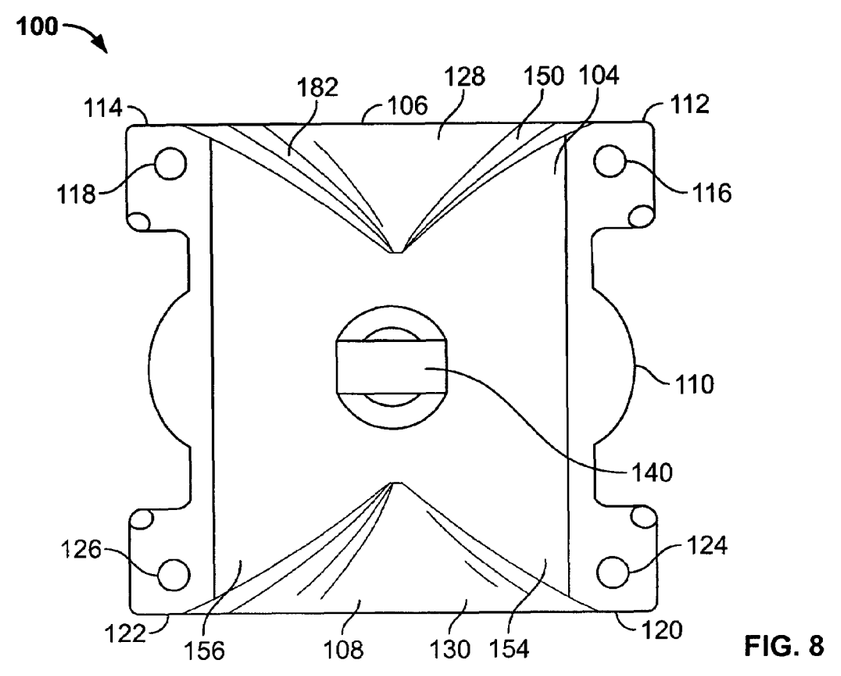
FIG. 8 is a back view of the reflector shown in FIG. 6.

FIGS. 6-8 shows a reflector 100 which is another example of the present invention which may be used with the LED 12 mounted on the substrate 18 shown in FIG. 1. The reflector 100 is fabricated from PMMA/Plexiglass material but any clear material may be used. The reflector 100 has a semi-cylindrical front surface 102 and an opposite backing surface 104. The cylindrical front surface 102 is divided into a top portion 106 and a bottom portion 108 by a cylindrical toroidal lens 110. The cylindrical toroidal lens 110 has the function of collimating or focusing light emitted from the LED 12 to substantially parallel to the horizontal plane.

The top portion 106 has a pair of vertical tabs 112 and 114 with mounting holes 116 and 118 respectively. The bottom portion 108 has a pair of vertical tabs 120 and 122 with mounting holes 124 and 126 respectively. The tabs 112, 114, 120 and 122 provide mounting surfaces to contact the substrate or another surface for placing the light device. The mounting holes 116, 118, 124 and 126 provide for the installation of fasteners such as screws or rivets to hold the reflector 100 in place.

The top portion 106 has a roughly parabolic reflective surface 128 while the bottom portion 108 has an opposite roughly parabolic reflective surface 130. The reflective surfaces 128 and 130 are TIR but may be specularly based or have facets as explained above.

The reflector 100 also has a cavity 140 on the back surface 104 which is rectangular in shape.

Furthermore, the TIR based reflector surfaces 128 and 130 allow a lens to be added to refract the light that is not collected by the TIR surfaces 128 and 130 of the reflector 100.

As with the above example, the shape of the reflector 100 and the quadrilateral symmetry allows the light from a light source in the cavity 140 to be emitted in a horizontal plane from the outer surface 102. The cylindrical toroidal lens 110 assists in collimating the light and focusing the intensity in the horizontal plane at a specific emission angle. Light which is emitted in the vertical plane at angles greater than the desired emission angle in the horizontal plane is reflected outward by the reflective surfaces 128 and 130. As explained above, the reflector 100 has quadrilateral symmetry for the reflective surfaces 128 and 130 which are divided into quadrants 150, 152, 154 and 156. The quadrants 150, 152, 154 and 156 of the reflector 100 are a mirror/rotated image of themselves. The curvature of the reflective surfaces 128 and 130 is dictated by the radiation pattern of the intended light source so optimally all the light is collected and is typically a 180 degree arc about the light source.

For higher lighting intensities or redundancy these light modules as shown in FIGS. 1-5 or 6-8 can be stacked on top of each other, side by side, or in a radial fashion or any combination of the three. This produces overlapping beam patterns that increases or completes a given beam angle specification.

Figure 9:
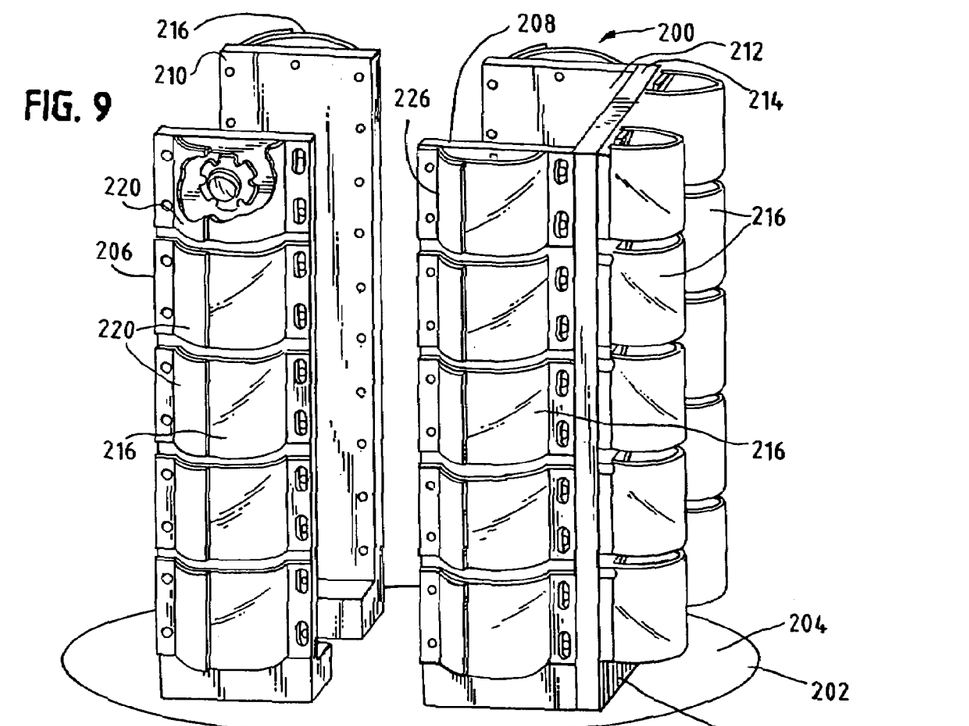
FIG. 9 is a side perspective view of a masthead light assembly incorporating a multiple number of reflector light sources similar to that shown in FIG. 1.
Figure 10:
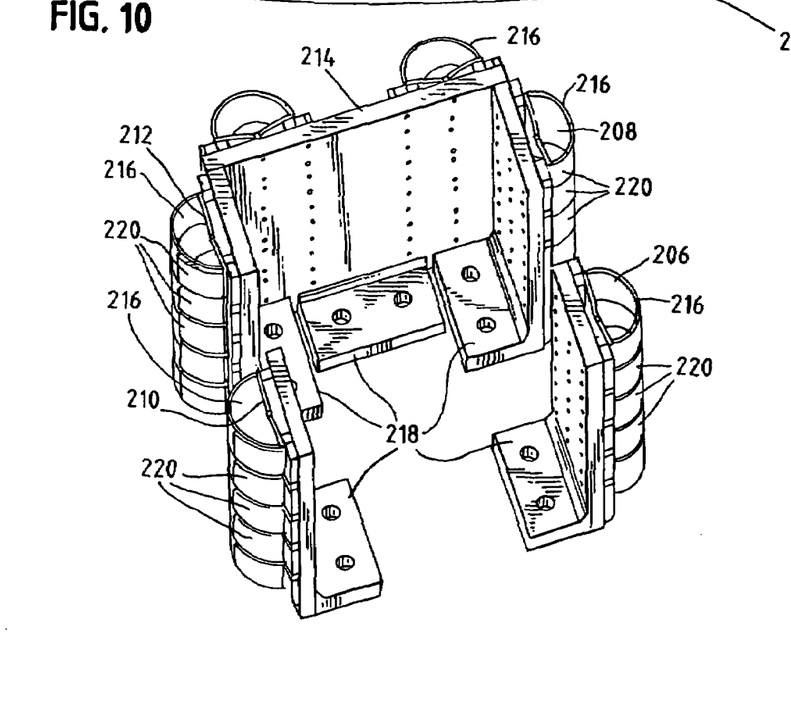
FIG. 10 is a top perspective view of the masthead light assembly in FIG. 9.

FIGS. 9-10 show a masthead antenna light 200 which incorporates multiple light modules as explained above. The masthead antenna light 200 is intended to emit powerful beams of light in certain specified angles to mark the position of an antenna masthead for aircraft or ships. The antenna masthead light 200 has a circular base support 202 which is mountable atop an antenna masthead. The circular base support 202 has a flat mounting surface 204 which supports a pair of side structures 206 and 208 and an opposite pair of side structures 210 and 212. A front structure 214 is also mounted on the flat mounting surface 204. The side structures 206, 208, 210 and 212 are identical to each other.

Each of the structures 206, 208, 210, 212 and 214 has a light array 216 which has a multiple number of reflector and light source assemblies similar to the light device 10 described above in FIGS. 1-4. Each of the structures 206, 208, 210, 212 and 214 has a respective heat sink 218 which is used to dissipate heat generated by the lights and as a base mount for the structures 206-214. The light assembly 200 is designed to emit light at an approximate 225 degree angle forward. The light array 216 mounted on the front structure 204 emit light over approximately 180 degrees. The light arrays 216 mounted on the side structures 206-214 are shuttered using a series of apertures 220 which restrict the light emission to the desired 225 degree angle forward.

Figure 11:
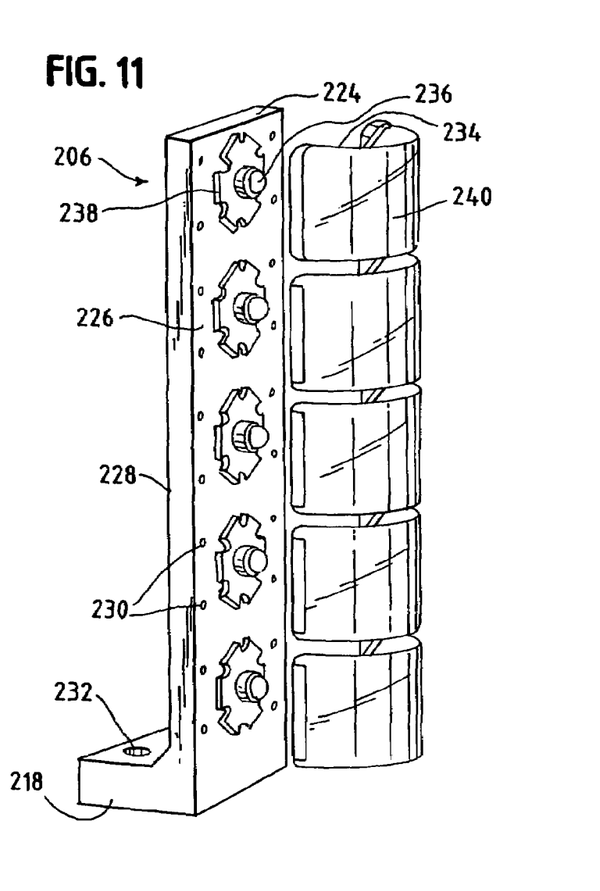
FIG. 11 is an exploded view of a side mounting structure for the masthead light assembly in FIG. 9.

The side structure 206 will now be described with reference to FIG. 11. The side structure 206 has a vertical backing support 224 which has a front surface 226 and a back surface 228. The backing support 224 has a series of mounting holes 230 which corresponding to the mounting holes on a reflector similar to the reflector 24 shown in FIGS. 1-4. The backing support 224 serves as a heat sink and is coupled to the heat sink 218 which also has a hole 232 therethrough for installation of electrical connections and wiring. A series of five LED light source assemblies 234 similar to the light source 10 shown in FIGS. 1-4 are mounted on the front surface 226 of the back support 224. The light assemblies 216 each have a LED 236 which is mounted on a heat spreader 238. The heat spreader 238 and LED 236 are in turn mounted on the front surface 226. A reflector 240 is installed over the LED 236. The reflector 240 allows the focusing of light emitted by the LED 236 in a planar beam and emits light over a 180 degree forward range.

Figure 12:
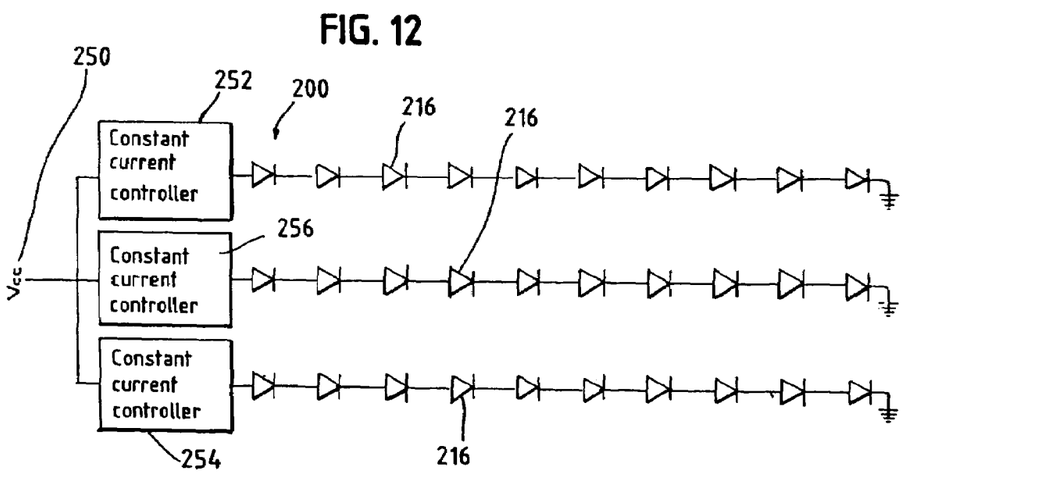
FIG. 12 is a circuit diagram for the LEDs shown in the masthead light assembly in FIG. 9.

FIG. 12 is a circuit diagram of the power of the electronic components for the masthead light 200 which is coupled to a power source 250. The LEDs of the light assemblies 216 on the side structures 206 and 208 are powered by a constant current controller 252 which is coupled to a power source 250. The LEDs of the light assemblies 216 on the side structures 210 and 212 are powered by a constant current controller 254 which is coupled to a power source 250. The LEDs of the light assemblies 216 on the front structure 214 are powered by a constant current controller 256 which is coupled to a power source 250. The constant current controllers 252, 254 and 256 convert alternating current into a 350 mA current in this example, but any suitable regulated power supply may be used.

In operation each of the light assemblies 216 emits a beam of light over a specific angle. Thus, the side mountings 206 and 208 have a series of ten LEDs in the light assemblies 216 which emit light over a narrow horizontal plane directly from the side mountings 206 and 208 due to the apertures 220. Similarly the LEDs of the light assemblies 216 attached to the side mounting assemblies 210 and 212 emit light over a narrow horizontal plane directly from those mountings due to the apertures 220. The front mounting 214 similarly has ten light devices which emit light ahead of the front mounting 214. In this manner, light is emitted in a 225 degree arc from the masthead antenna light assembly 200. Of course, more or less light devices may be mounted for different light intensity levels.

It will be apparent to those skilled in the art that various modifications and variations can be made in the method and system of the present invention without departing from the spirit or scope of the invention. For example, the reflector may be used with many different light sources other than LEDs. Thus, the present invention is not limited by the foregoing descriptions but is intended to cover all modifications and variations that come within the scope of the spirit of the invention and the claims that follow.

What is claimed is:

1. A directed light source for efficient light emission, the light source comprising:
    a planar substrate having a front surface and an opposite back surface;
    a light emitting device located on the front surface of the planar substrate;
    a clear reflector having a back surface facing the front surface of the planar substrate and a semi-cylindrical front surface having a vertical axis, the reflector including a reflecting top surface and an opposite and quadrilaterally symmetrical reflecting bottom surface, the reflector causing light from the light emitting device to be directed out from the semi-cylindrical front surface in a substantially horizontal plane.

2. The light source of claim 1 wherein the reflector is fabricated from plastic.

3. The light source of claim 1 wherein the light emitting device is a light emitting diode (LED).

4. The light source of claim 1 further comprising a heat sink coupled to the back surface of the planar substrate.

5. The light source of claim 1 further comprising a semi-cylindrical toroidal lens located on the semi-cylindrical front surface which collimates light substantially parallel to the horizontal plane.

6. The light source of claim 5 further comprising a semi-cylindrical toroidal lens located on the semi-cylindrical front surface which collimates light substantially parallel to the horizontal plane.

7. The light source of claim 1 wherein the top and bottom reflecting surfaces are angled such to create total internal reflection of light from the light emitting device.

8. The light source of claim 1 wherein the top and bottom reflecting surfaces have a specular reflective layer.

9. The light source of claim 8 wherein the specular reflective layer is an evaporated aluminum coating.

10. The light source of claim 8 wherein the specular reflective layer is a sprayed chrome finish.

11. The light source of claim 1 further comprising lens formed in a cavity in the back surface of the reflector, and wherein the lens focuses light on the horizontal plane.

12. The light source of claim 1 wherein an aperture is installed over a part of the semi-cylindrical front surface to restrict the angle of light emission.

* * * * *